Nov. 24, 1931.　A. E. SPINASSE　1,833,379
METHOD OF AND APPARATUS FOR DRAWING GLASS
Filed July 31, 1926

Inventor
Arthur E. Spinasse

Patented Nov. 24, 1931

1,833,379

UNITED STATES PATENT OFFICE

ARTHUR E. SPINASSE, OF MOUNT VERNON, OHIO, ASSIGNOR TO PITTSBURGH PLATE GLASS COMPANY, A CORPORATION OF PENNSYLVANIA.

METHOD OF AND APPARATUS FOR DRAWING GLASS

Application filed July 31, 1926. Serial No. 126,286.

The present invention relates to improvements in method of an apparatus for drawing glass, and is a continuation in part of my similarly entitled co-pending application Serial No. 702,198, filed March 27, 1924.

It is an object of the invention to provide an improved method and apparatus for drawing the flat sheets of glass of substantially uniform thickness to and including the edges or margin portions of the sheet, and to prevent the shrinking inwardly of the edges of the sheet as the sheet is drawn upwardly from the glass bath.

With the foregoing and other objects in view, the invention will be more fully described hereinafter, and will be more particularly pointed out in the claims appended hereto.

In the drawings, wherein like symbols refer to like or corresponding parts throughout the several views, Figure 1 is a fragmentary top plan view of an apparatus constructed according to the present invention.

Referring more particularly to the drawings, 1 designates one of the walls of the furnace containing the molten glass of the glass bath 2, and 3 represents the sheet of glass which is drawn upwardly from the bath by an appropriate bait or other drawing tool, the sheet being drawn through the usual drawing rolls 26.

Figure 1:
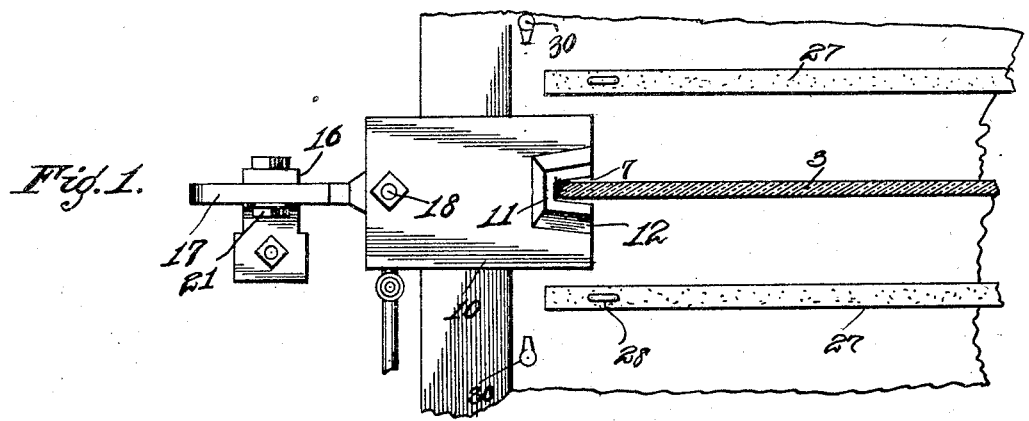

In Figure 1, shield members 27 are shown as placed parallel with the drawn glass sheet 3 to cut off and regulate the furnace heat from the side portions of the sheet. In Figure 1, are also shown the burner jets 30 to locally increase or decrease the temperature in the region where the edges of the sheet are drawn.

For convenience in illustration only one edge of the glass sheet is shown but it will be understood that the same parts may be duplicated at the opposite edge of the sheet.

Figure 4:
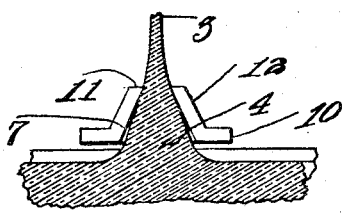
Figure 4 is an end view of the slot member showing a portion of the glass bath and the glass sheet drawn therethrough.
Figure 3:
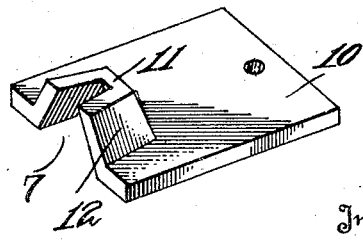
Figure 3 is a perspective view of one of the slot members employed.

In accordance with the invention I provide a slot member 10 preferably in the form of a plate, as shown more particularly in Figure 3. The plate is made with the slot 7, which slot is continued upwardly through the flanges or upstanding walls 12, which walls may be made as a part of the plate if desired, and the plate may be made of metal, refractory clay or other material. The slot 7 may be tapered if desired, narrowing upwardly as indicated in Figure 4, and the slot may be wider at its outer open portion and taper inwardly to the acute angle portion 11.

Figure 2:
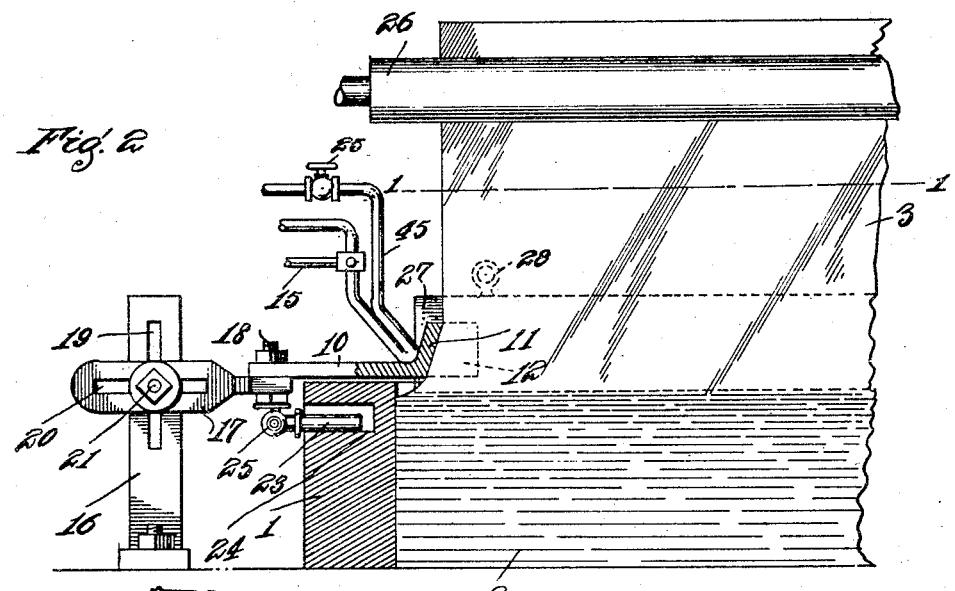
Figure 2 is a vertical section through the same.

The plate 10 is perforated to receive the substantially vertical pivot bolt or pin 18 by which the plate may swing in a horizontal plane for purposes of adjustment. The pin 18 adjustably secures the plate 10 to the slotted link member 17 having the horizontally disposed closed slot. This link member 17 is secured to the pedestal or base member 16 having the vertical slot 19. A bolt or pivot pin 21 is made to pass through the slots 20 and 19, whereby to secure the link member 17 in adjusted position. The link member may be adjusted up and down the pedestal or base member 16; it may be adjusted horizontally by virtue of the slot 20, or it may pivot in a substantially vertical plane about the pin or fulcrum 21. A heating and cooling means may be provided in conjunction with the slot member if desired and in Figure 2, I illustrate one form of such device as consisting of the pipe 45 bent upon itself and supported as upon the arm 15. The pipe is provided with a valve 25 in its induction branch to control the flow of the cool or hot fluid medium thereto. The bight of the pipe may be disposed close to the portion of the plate 10 or glass edge forming member which is close to or in contact with the edge of the sheet. It will be understood that although the side walls of the slot in the slot member are shown as straight, these walls may be rounded.

In the furnace wall 1 is shown a pocket or channel 23 extending close to the point of generation of the edges of the sheet, and in this channel or pocket I dispose a pipe or nozzle 23 for conveying temperature-affecting medium of the pocket or channel 24 under the control of a valve 25' to increase and decrease the viscosity of the glass at the source of the drawn edge.

According to the improved method and operation of the apparatus, the glass is gathered upon an appropriate tool from the free natural surface of the bath 2, whereby glass of high quality may be drawn, such as would be impracticable from dies or other devices up through which the glass is forced by hydrostatic pressure. At the base of the drawn sheet, when thus freely drawn, a thickened portion 4 naturally forms from the free surface of the bath. This portion forms in inverted V-shape. The slot members are placed above the bath of glass but in position to receive this thickened or wedge shaped portion of the glass at the edge and border portion of the forming sheet to partially reduce this thickened portion.

Necessarily a retarding frictional action upon the upwardly drawn glass takes place in the slot member resulting in the longitudinal stretching of the border portions of the sheet from the drawing tool to the slot members and this will also result in avoiding the transverse collapse or shrinkage of the sheet between the stretched border portions. Although it is not necessary that the glass adhere to the wall of the slot member, I prefer that the glass adhere thereto. The member 10 is preheated to secure and maintain such adhesion, such adhesion producing a better edge and a better temper in the sheet. By use of the pipe 45 or other device I am enabled to regulate the degree of the adhesion to insure that the width of the sheet will be maintained uniform during drawing and to produce an edge of desired thickness. At times the jet 23 may be put into operation to control the anchorage at the source of the drawn edge. With the upwardly extending flange 12, I secure an elongated upwardly extending slot for gradually reducing the thickness of the glass.

The plate 10 serves to protect the drawn edge of the sheet from the radiating heat from the bath and the upwardly extending wall 12 of the slot member, which projects above the plane of the plate 10, protects the drawn edges of the glass from the furnace heat, as well as to shape said edge in desired reduced thickness. By reason of the position of the preheated edge forming members, the same are maintained hot and therefore adhere to the drawn glass. By use of the invention much breakage is eliminated.

From the above it will be understood that the edging members have slots which engage the tapering base of the drawn glass at a point below the upper reduced end of the tapering base, said slots being narrower than the normal thickness of said tapering base at the point of engagement therewith to partially reduce the thickness thereof, and being wider than the thickness of the finished edges of the sheet to create a dragging action at the contracted portion of the tapering base and at the same time preserving sufficient tapering thickness above the contracted portion to prevent injury to the draw.

What is claimed is:—

1. In an apparatus for drawing sheet glass from the free surface of a bath of molten glass at a particular level, a pair of hot plates at the edges of the glass sheet being drawn from the bath, said plates having upwardly extending walls forming restricted slots through which the edges and border portions of the sheet are upwardly drawn and reduced in thickness, and means for maintaining said plates in spaced fixed position above the surface of the bath.

2. In an apparatus for drawing sheet glass from the free surface of a bath of molten glass, edge forming members placed at opposite edges of the sheet in fixed position spaced above the bath of glass and having upwardly converging walls for receiving the edges and border portions of the glass sheet for acting to thin down such edges and to create a frictional resistance to the passage of the glass therethrough.

3. In an apparatus for drawing sheet glass from the free surface of a bath of molten glass, edge forming members placed at opposite edges of the sheet in fixed postion spaced above the bath of glass and having upwardly converging walls for receiving the edges and border portions of the glass sheet for acting to thin down such edges and to create a frictional resistance to the passage of the glass therethrough, and means to increase or decrease the degree of the frictional resistance.

4. In apparatus for drawing sheet glass from an open bath of molten glass at a particular level, an edging device comprising a hot horizontal metallic plate having upwardly converging walls spaced apart to form a slot opening through the end, top and bottom thereof, said device being fixed in position spaced above the surface of the bath so that the lower portion of the initially thickly drawn glass from which the sheet forms extends in the slot and the walls forming the slot being adapted to contact and adhere with the side faces of the aforesaid border portion passing through the slot to shape said border portion and prevent the narrowing of the sheet, said plate being of such form as to protect and shield the forming border portions from the bath below and thereby promote the cooling of the same.

5. An edging member for drawing sheet glass from a bath of molten glass at a particular level, said edging member comprising a flat plate having spaced apart walls projecting from the plate to form an open slot, and being positioned spaced above the bath to receive the initially thickly drawn glass from which the sheet proper forms, the walls forming the slot being adapted to contact and adhere with the side face of the aforesaid border portion to shape said border portion and prevent the narrowing of the sheet, and the said walls and plate being of such form to protect and shield the border portion of the forming sheet from the glass below during drawing.

6. In apparatus for drawing sheet glass from the normal surface of the bath at a particular level, means for maintaining the desired width of the sheet comprising a fixed hot member extending wholly spaced from and above the surface of the bath, said member having spaced apart walls extending upwardly and inwardly toward the sheet to form a slot through which the edge and border portions of the sheet may be adherently drawn to regulate the thickness thereof.

7. In apparatus for drawing sheet glass, the combination with a receptacle adapted to contain an open bath of molten glass at a particular level, a hot plate having upwardly extending walls forming a slot opening through its bottom, side and upper end, the walls forming the slot being adapted to contact and adhere with the glass being drawn and being spaced apart so that the slot is wider at all points of contact with the glass than the finished thickness of the border portion of the sheet being drawn to receive the border portion of the meniscus from which the sheet proper forms, means outside the receptacle for adjustably holding said plate in position spaced above the bath adjacent the walls of the receptacle to receive the aforesaid border portion of the meniscus, and means for drawing the sheet from the open bath with said border portion passing through the slot in adherent dragging contact against the walls forming the slot to shape said border portion and prevent the narrowing of the sheet.

8. In apparatus for drawing sheet glass from an open bath at a particular level, a hot adherent edging device having upwardly-extending spaced-apart walls to form a passage therebetween open at top, bottom and one side with the side opening wider at all portions than the finished thickness of the sheet, said member being located wholly spaced from and fixed above the surface of the bath for adherently embracing and shaping the border portion only of the meniscus of the forming sheet, said device being of such form so as to shield the forming border portion of the sheet which passes between and above said walls from the bath beneath said device, and means for modifying and controlling the temperature of the glass below said edging device.

In testimony whereof I affix my signature.
ARTHUR E. SPINASSE.